United States Patent
Zhou et al.

(10) Patent No.: US 9,878,644 B2
(45) Date of Patent: Jan. 30, 2018

(54) CHILD SAFETY SEAT

(71) Applicants: Yunzhen Larry Zhou, Markham (CA); Giuseppe Rotiroti, Richmond Hill (CA)

(72) Inventors: Yunzhen Larry Zhou, Markham (CA); Giuseppe Rotiroti, Richmond Hill (CA)

(73) Assignee: Clek Inc., Toronto, ON (CA)

( * ) Notice: Subject to any disclaimer, the term of this patent is extended or adjusted under 35 U.S.C. 154(b) by 0 days.

(21) Appl. No.: 14/719,313

(22) Filed: May 21, 2015

(65) Prior Publication Data
US 2016/0082865 A1    Mar. 24, 2016

Related U.S. Application Data

(60) Provisional application No. 62/001,408, filed on May 21, 2014.

(51) Int. Cl.
*B60N 2/28* (2006.01)

(52) U.S. Cl.
CPC ......... *B60N 2/2884* (2013.01); *B60N 2/2809* (2013.01); *B60N 2/2821* (2013.01)

(58) Field of Classification Search
CPC .............. B60N 2/2884; B60N 2/42727; B60N 2/42736
See application file for complete search history.

(56) References Cited

U.S. PATENT DOCUMENTS

| | | | | | |
|---|---|---|---|---|---|
| 3,917,339 | A | * | 11/1975 | Fritz | B60N 2/42736 267/131 |
| 5,462,333 | A | * | 10/1995 | Beauvais | B60N 2/2821 297/216.11 |
| 6,513,870 | B1 | * | 2/2003 | Takizawa | B60N 2/2812 297/216.11 |
| 7,219,958 | B2 | * | 5/2007 | Yamazaki | B60N 2/2806 297/216.11 |
| 7,699,393 | B2 | * | 4/2010 | Forbes | B60N 2/2884 297/216.11 |
| 8,348,337 | B2 | * | 1/2013 | Franck | B60N 2/2809 297/216.11 |
| 2014/0239684 | A1 | * | 8/2014 | Mindel | B60N 2/2824 297/216.18 |
| 2014/0246888 | A1 | * | 9/2014 | Renaudin | B60N 2/2806 297/250.1 |
| 2014/0252841 | A1 | * | 9/2014 | Balensiefer, II | B60N 2/2812 297/471 |

* cited by examiner

*Primary Examiner* — Philip F Gabler
(74) *Attorney, Agent, or Firm* — Graham Patent Law

(57) ABSTRACT

A child safety seat includes a seat base, and a seat body assembly that is slidably coupled to the seat base. The seat base includes a bottom. The energy absorber is configured to translate front and rear portions of the seat body assembly substantially linearly towards the bottom and to reduce impact forces imposed on the seat body assembly during a deceleration of the child safety seat.

11 Claims, 17 Drawing Sheets

CHILD SAFETY SEAT

RELATED APPLICATIONS

This patent application claims the benefit of the filing date of U.S. Patent Application Ser. No. 62/001,408, entitled "Child Safety Seat", filed May 21, 2014.

FIELD OF THE INVENTION

This patent application relates to a safety seat intended for installation in an automotive vehicle, and particularly relates to a child safety seat having an impact absorbing mechanism that can reduce impact forces upon a seat occupant.

BACKGROUND

Children traveling in a motor vehicle are particularly vulnerable to injury from impact forces when the vehicle stops rapidly. Efforts have been made to develop child safety seats that reduce the effect of these forces on the child. Infants are required to ride in a rear-facing child safety seat to allow impact forces on the child's body to be absorbed by the padding of the child seat.

An older, more robust, child may ride in a front-facing seat. In a front-facing seat, typically a multiple-point harness secures the child into the seat. Although the child may be retained in the seat upon vehicle impact, the straps themselves can cause injury by digging into the child. In addition certain parts of the child's body, such as the child's head and neck, are not secured by straps and may be exposed to whiplash forces.

It is therefore desirable to reduce the impact forces that are transferred to a child's body when the vehicle stops rapidly.

SUMMARY

As described in this patent application, there is provided a child safety seat that includes a seat base, and a seat body assembly that is slidably coupled to the seat base. The child safety seat also includes an energy absorber that is configured to translate front and rear portions of the seat body assembly substantially linearly towards the bottom of the seat base and to reduce impact forces imposed on the seat body assembly during a deceleration of the child safety seat.

The energy absorber may be configured such that the energy absorber opposes a rotational force that is imparted on the seat body assembly during the deceleration of the child safety seat. The energy absorber may comprise an energy absorbing member, and an impactor piston that is configured to deform the energy absorbing member at a front region thereof at a lower rate than at a rear region thereof.

The energy absorber may be configured to lower a centre of gravity of the seat body assembly during the deceleration. The energy absorber may also be further configured to translate the front and rear portions of the seat body assembly along a plane that provides for vertical movement of the seat body during the deceleration of the child safety seat prior to horizontal movement of the seat body during the deceleration of the child safety seat. The energy absorber may comprise an energy absorbing member that is supported by the seat base, and an impactor piston that is secured to the seat body assembly and the seat base such that front and rear regions of the impactor piston translate along the plane during the deceleration of the child safety seat.

In one implementation, the seat base includes a fore through-hole disposed in a fore region thereof, and an aft through-hole disposed in an aft region thereof, and the impactor piston includes a front impactor aperture disposed in the front region thereof in alignment with the fore through-hole, and a rear impactor aperture disposed in the rear region thereof in alignment with the aft through-hole. The seat body assembly is coupled to the seat base via pins each extending through a respective one of the through-holes and the impactor aperture that is in alignment with the one through-hole.

Preferably, the elongate apertures are elongate apertures each having a major axis that is parallel to the plane. Further, preferably the seat base comprises a pair of side walls and a channel disposed therebetween, the energy absorbing member is disposed within the channel, the through-holes are provided in the side walls, and the elongate apertures are configured to maintain the pins in a pre-impact position within the elongate apertures and to allow the impactor piston to translate relative to the pins when an impact force on the seat body assembly exceeds a predetermined maximum limit.

In one implementation, the impactor piston is configured to provide a step-wise-increasing form of energy absorption as the seat body assembly moves linearly towards the bottom surface. Preferably, an end of the impactor piston includes a plurality of impactor stages that engage an end of the energy absorbing member, and each impactor stage is configured to transfer energy to the energy absorbing member at different rates.

BRIEF DESCRIPTION OF THE DRAWINGS

The child safety seat will now be described, by way of example, with reference to the accompanying drawings, in which.

DETAILS

Figure 1:
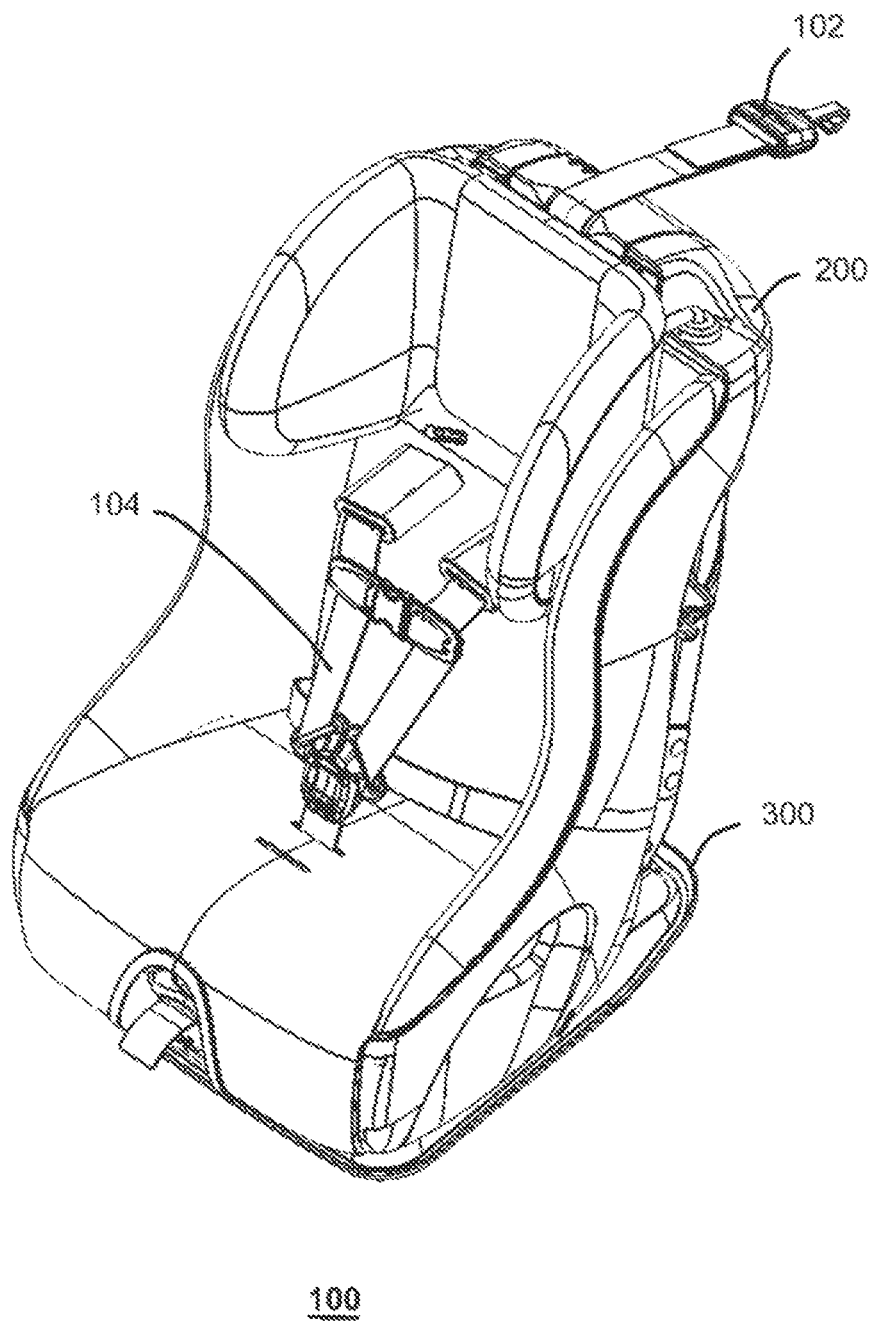
FIG. 1 is a overhead view of the assembled child safety seat.

Turning to FIG. 1, there is shown a child safety seat 100 intended for installation in a motor vehicle, such as a car or truck, as a front-facing or rear-facing safety seat. As shown, the safety seat 100 comprises a seat body assembly 200 and a seat base 300. The seat body assembly 200 is slidably coupled to the seat base 300 via an energy absorbing assembly 400 (FIGS. 4 to 7) that is connected to the seat body assembly 200 and the seat base 300.

The safety seat 100 is disposed on a car seat of the vehicle, and is secured to the vehicle via the seat body assembly 200. As will be explained, the energy absorbing assembly 400 reduces impact forces imposed on the seat body assembly 200, such as those imposed during a rapid negative acceleration (deceleration) of the vehicle (e.g. if the vehicle collides with another vehicle or a stationary object while travelling forwards and the child safety seat 100 is mounted as front-facing safety seat). Further, the energy absorbing assembly 400 allows the front and rear portions of the seat body assembly 200 to translate substantially linearly towards the bottom surface of the seat base 300 when the seat body assembly 200 is exposed to impact forces. As a result, the energy absorbing assembly 400 lowers the centre of gravity of the seat body assembly 200 during the rapid deceleration of the vehicle (and the child safety seat 100).

Figure 2:
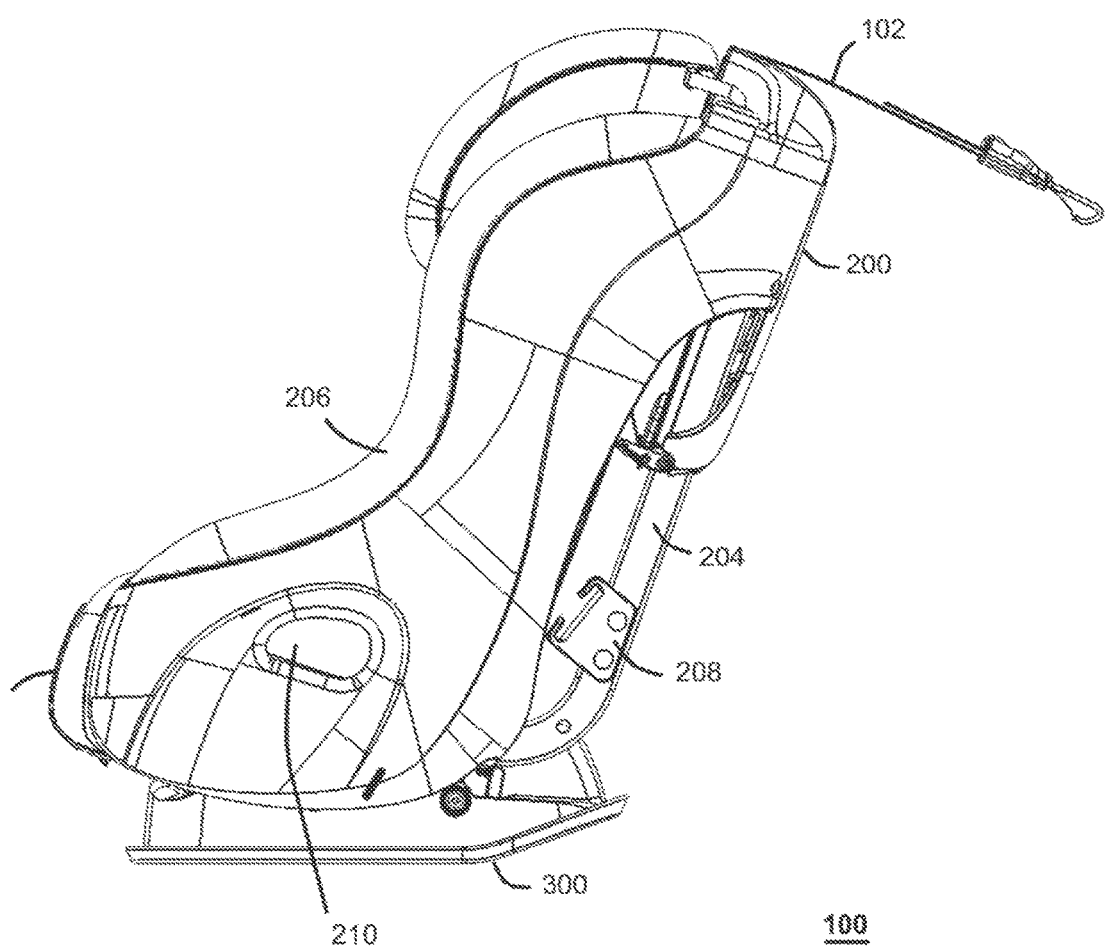
FIG. 2 is an elevation of the left side of the child safety seat, depicting the seat assembly and the seat base.
Figure 3:
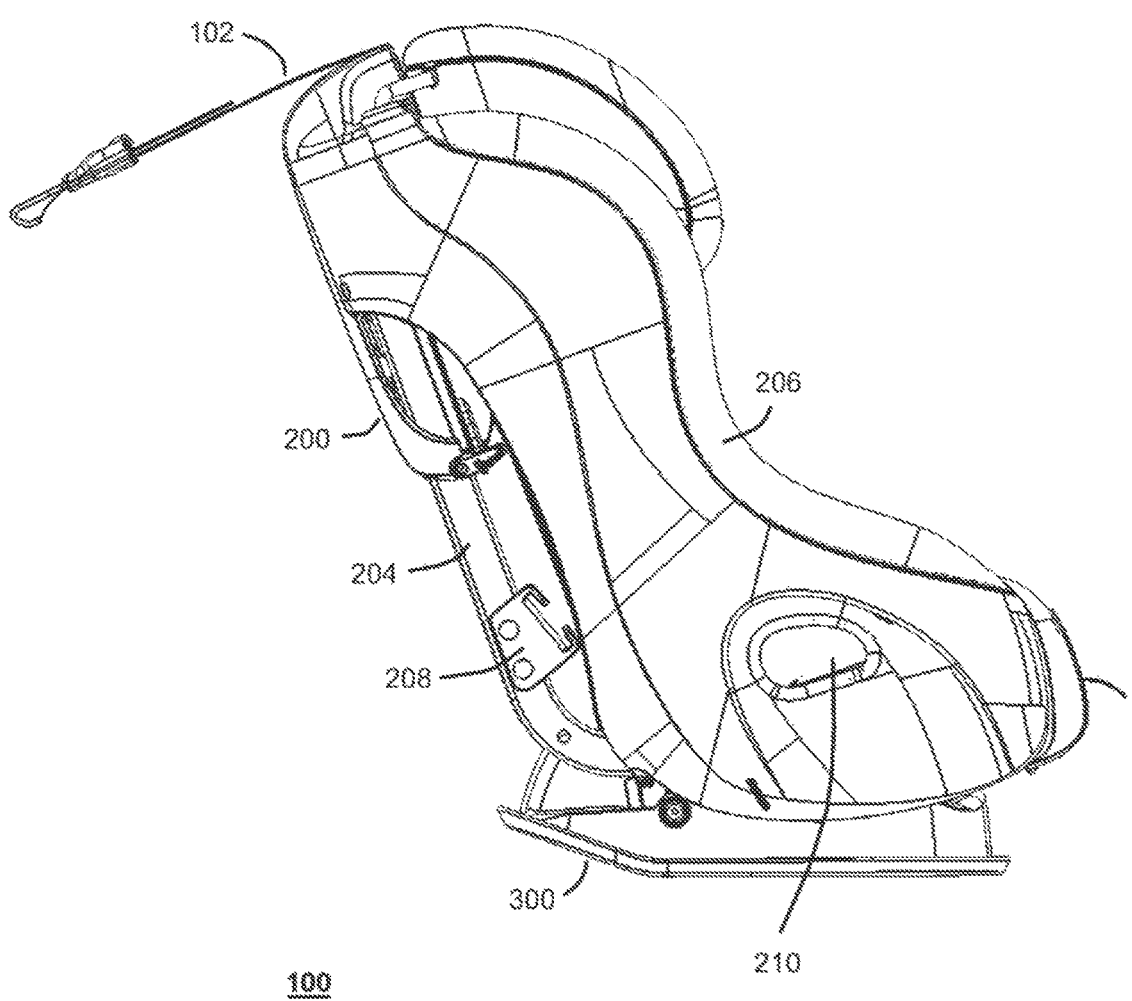
FIG. 3 is an elevation of the right side of the child safety seat of FIG. 2.
Figure 4:
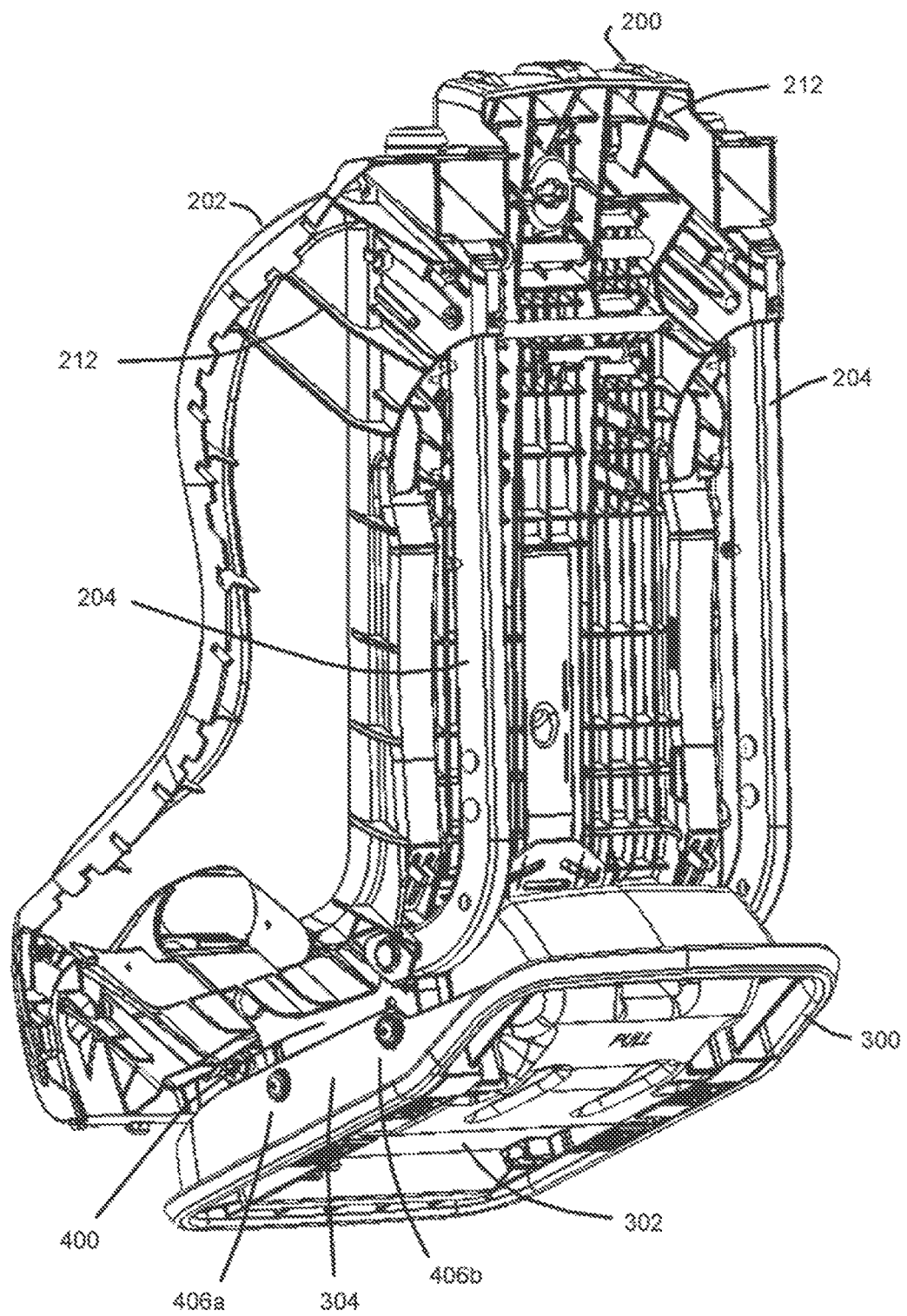
FIG. 4 is a perspective view of the left and rear of the child safety seat of FIG. 2, revealing the seat shell beneath the back and seat cushions.
Figure 5:
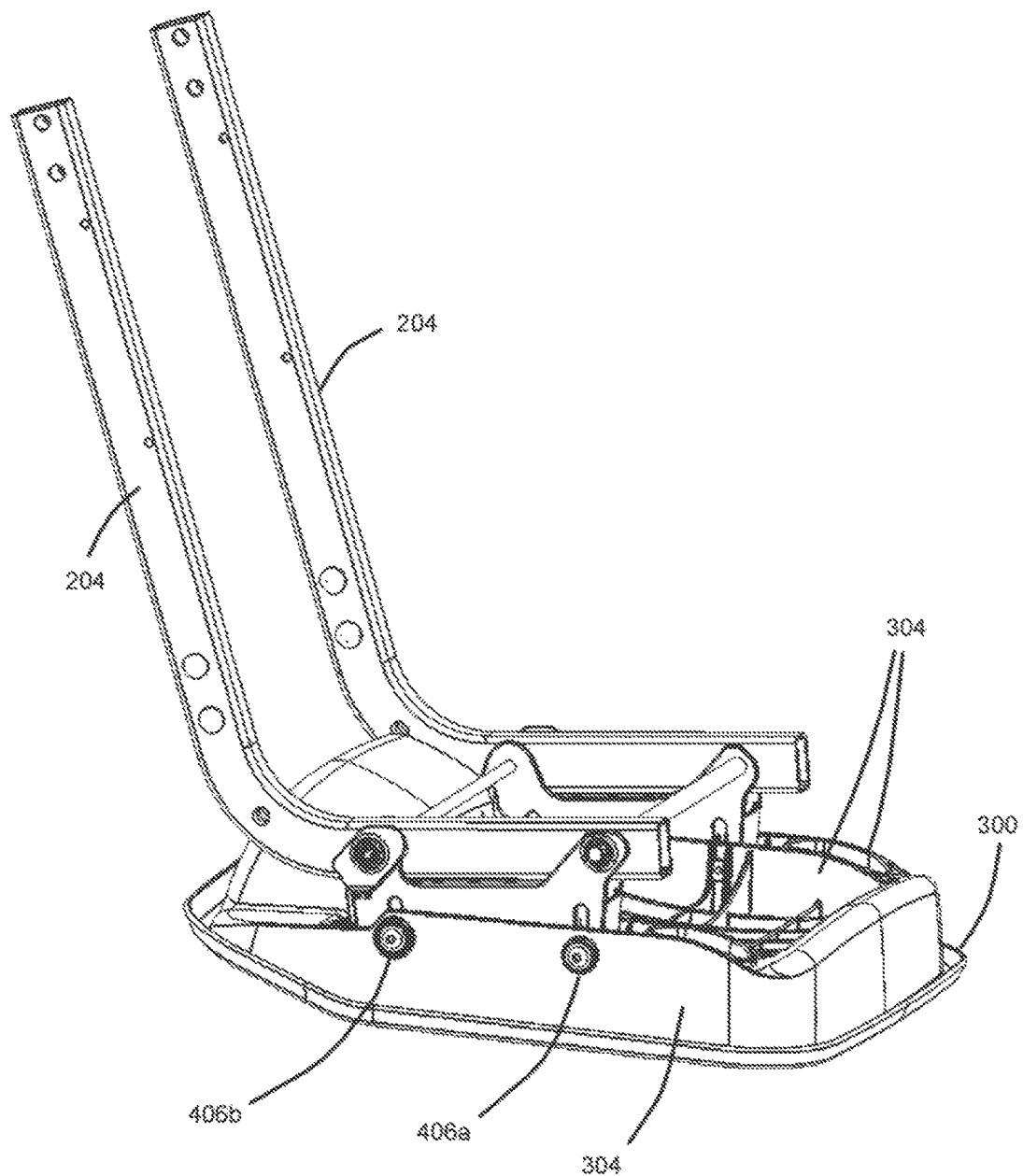
FIG. 5 is a perspective view of the right and front of the child safety seat in a pre-impact mode, depicted without the seat shell and cushions, revealing the seat support rails.
Figure 6:
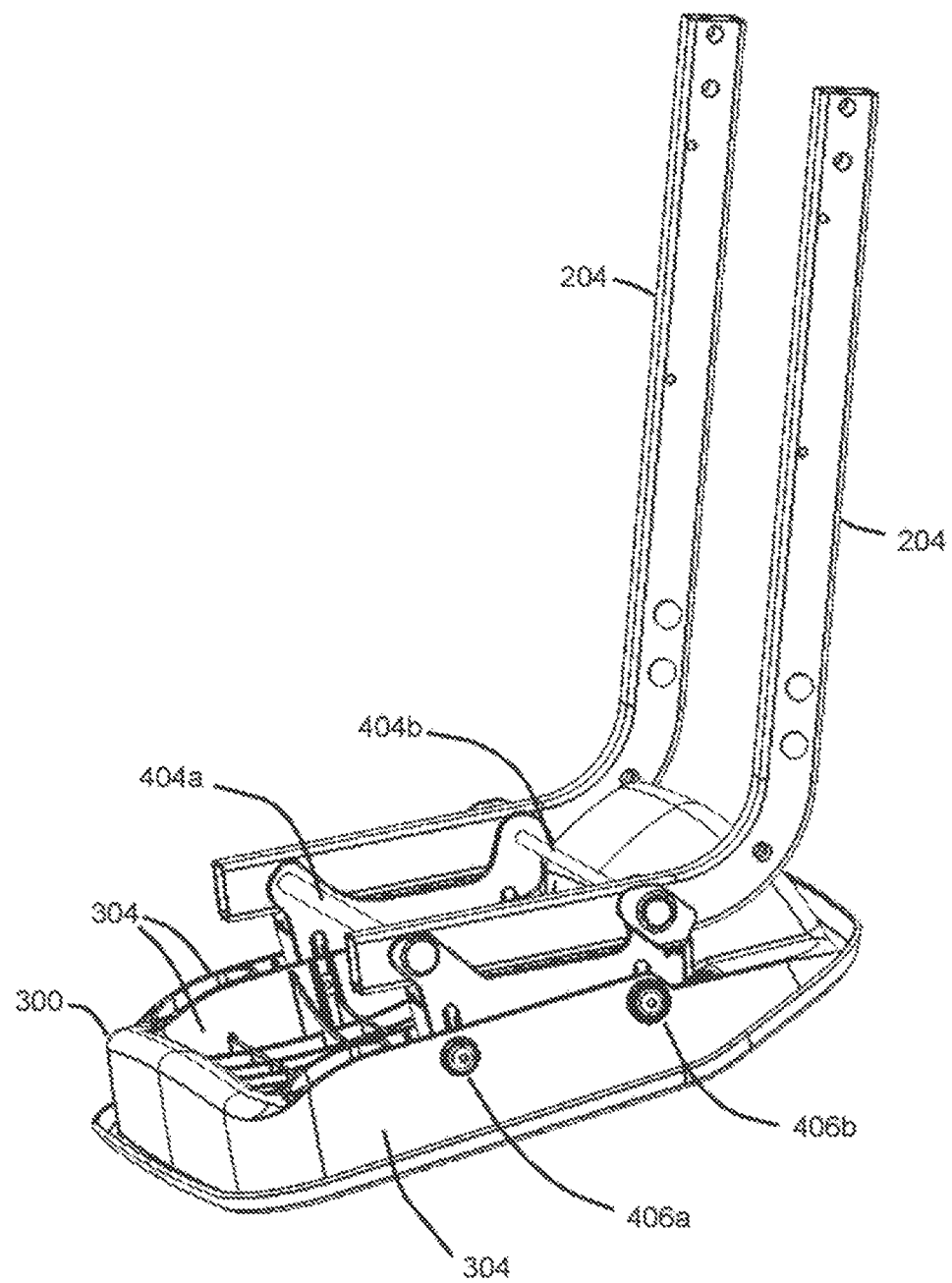
FIG. 6 is a perspective view of the left and front of the child safety seat of FIG. 5.
Figure 7:
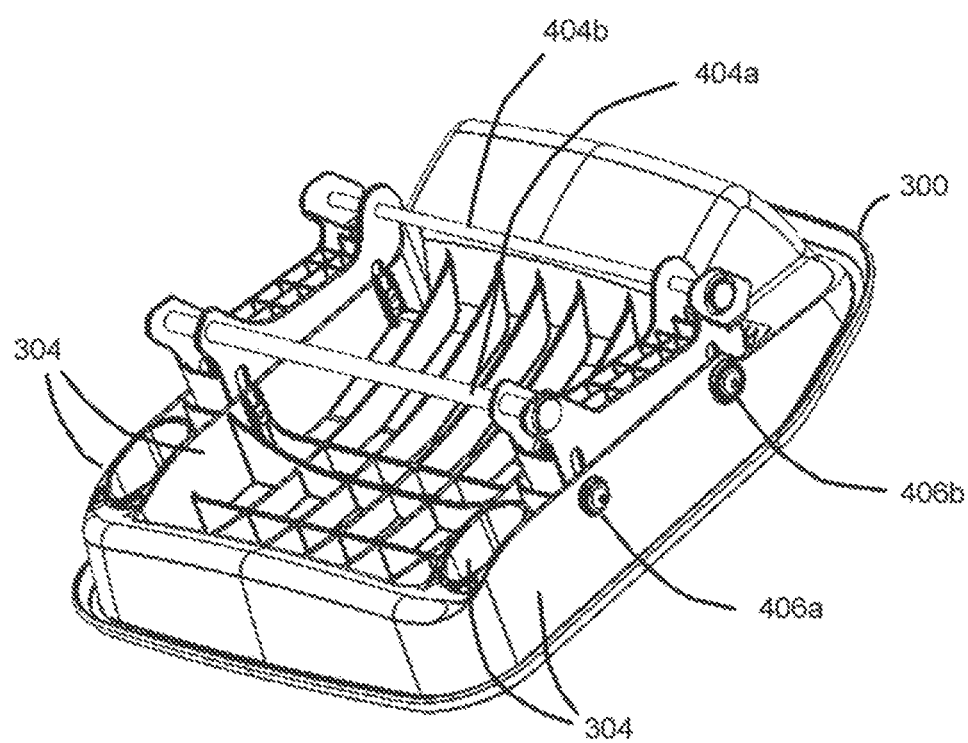
FIG. 7 is a perspective view of the left and front of the child safety seat of FIG. 5, depicted without the seat support rails, revealing the impactors.

As shown in FIGS. 2 to 4, the seat body assembly 200 includes a seat shell 202, a pair of L-shaped support tubes 204 secured to the seat shell 202, a resilient impact-absorbing foam cushion (not shown) disposed on the front of the seat shell 202, and a seat cover 206 disposed over the cushion and enclosing the seat shell 202. In FIG. 4, the safety seat 100 is depicted without the seat cover 206 and cushion to thereby show some internal features of the safety seat 100, such as the seat shell 202 and the energy absorbing assembly 400. It should be understood that, notwithstanding FIG. 4, it might not be possible to modify a safety seat 100, post-manufacture, to expose the internal features in the manner shown, at least without damaging the seat 100.

As shown in FIG. 4, the seat shell 202 includes a back portion and a seat portion integrally molded with the back portion, and a plurality of reinforcing ribs 212 integrally molded with the shell 202 on the rear surface thereof to increase the structural rigidity of the shell 202. Preferably, the L-shaped support tubes 204 are secured to the seat shell 202 at the back portion and the seat portion, and are each secured to the seat shell 202 proximate a respective side of the seat shell 202.

Further, as shown in FIGS. 2 and 3, the seat body assembly 200 includes a pair of rear lap belt guides 208, each secured to a respective support tube 204, proximate the seat base 300 and the seat portion of the seat shell 202, for receiving a lap belt (not shown) of the motor vehicle seat upon which the child safety seat 100 is placed. The seat body assembly 200 also includes a pair of front lap belt ports 210 for receiving the lap belt of the motor vehicle seat. When the child safety seat 100 is mounted as a front-facing safety seat, the lap belt is passed through the rear lap belt guides 208 and tightened, the rear of the back portion of the seat body assembly 200 is held against the seat back of the vehicle seat. Conversely, when the child safety seat 100 is mounted as a rear-facing safety seat, the lap belt is passed through the front lap belt ports 210 and tightened, the seat portion of the seat body assembly 200 is held against the seat back of the vehicle seat.

Preferably, the child safety seat 100 also includes a top tether strap 102 (see FIG. 1), secured to the seat shell 202 proximate the top of the back portion thereof, for anchoring the top portion of the child safety seat 100 to the vehicle when the safety seat 100 is mounted as front-facing safety seat; and a child restraint belt system 104 (see FIG. 1), secured to the seat shell 202, for retaining a child in the child safety seat 100.

As will become apparent, the child safety seat 100 will have a natural tendency to move horizontally away from the vehicle seat when the child safety seat 100 undergoes a rapid deceleration (e.g. if the vehicle collides with another vehicle or a stationary object). The energy absorbing assembly 400 is configured to translate the front and rear portions of the seat body assembly 200 along respective parallel planes that provide for substantially vertical movement of the seat body assembly 200 when the child safety seat 100 is mounted as a front-facing safety seat and decelerates rapidly, prior to the horizontal movement of the child safety seat 100.

As shown in FIGS. 4 to 7, 9, the seat base 300 includes a substantially planar bottom 302, a two pairs of upright side walls 304 integrally-molded with and extending vertically from the bottom 302. Each pair of upright side walls 304 is disposed proximate a respective side of the seat base 300, and defines a respective channel 306 therebetween. The seat base 300 also includes two pairs of fore through-holes 308a disposed in a fore region of the upright side walls 304, and two pairs of aft through-holes 308b disposed in an aft region of the upright side walls 304.

The seat body assembly 200 and the seat base 300 may be formed from a lightweight material, such as magnesium alloy or plastic, and have a uni-body construction to impart strength and lightness to the respective assemblies.

The energy absorbing assembly 400 includes an energy absorbing member 402 supported by the seat shell 202, and an impactor piston 500 coupled to the seat shell 202. As will be explained, the impactor piston 500 dissipates kinetic energy through the energy absorbing member 402 by deforming the energy absorbing member 402 as the seat body assembly 200 moves linearly towards the bottom 302 of the seat base 300, for example during a rapid deceleration of the vehicle.

Further, as will be appreciated, the rapid deceleration of the vehicle will impart a rotational force on the seat body assembly 200. The energy absorbing assembly 400 also opposes the rotational force during the deceleration of the vehicle. Accordingly, the impactor piston 500 may be configured to deform the energy absorbing member 402 at a front region thereof at a lower rate than at a rear region thereof.

Figure 8:
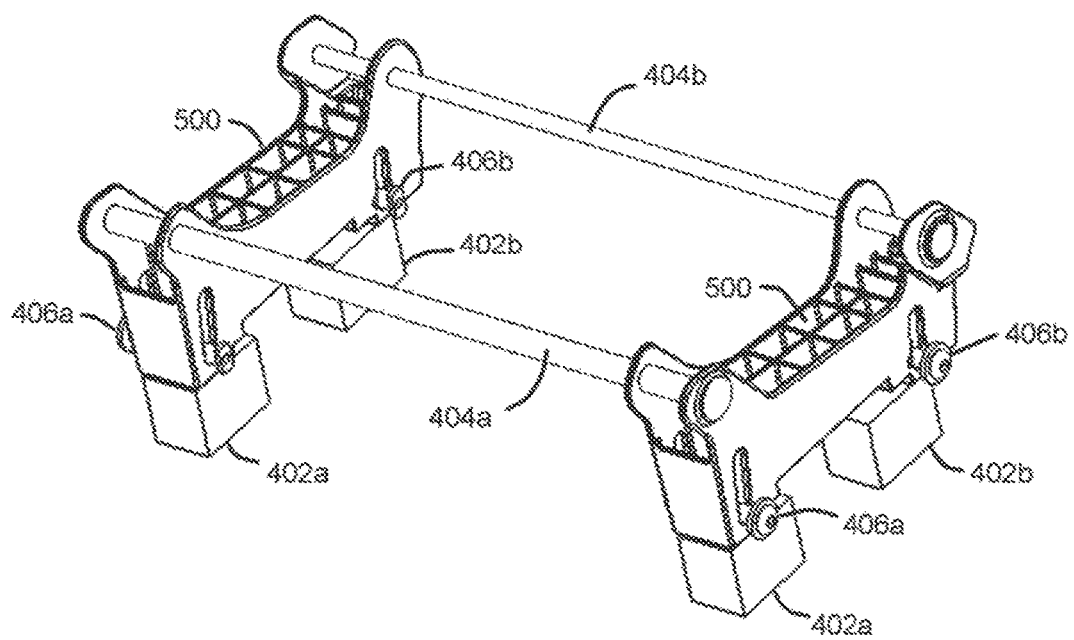
FIG. 8 is a perspective view of the left and front of the child safety seat of FIG. 7, depicted without the seat base, revealing the impactors and the energy absorbing members.
Figure 9:
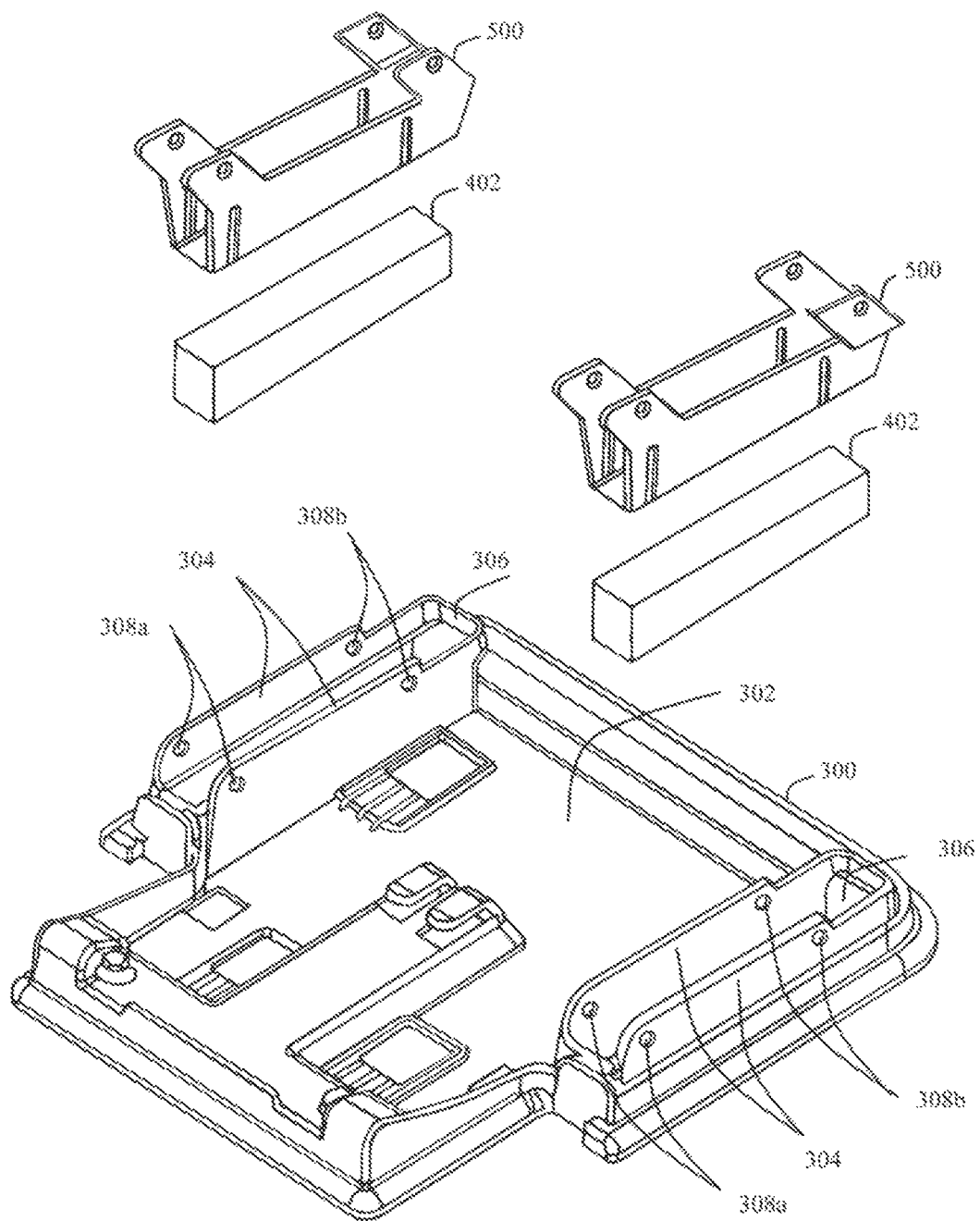
FIG. 9 is an exploded view of the energy absorbing assembly, including the impactor pistons and the energy absorbing members, and the seat base assembly.

As shown in FIG. 9, the energy absorbing assembly 400 may include a pair of monolithic energy absorbing members 402, each disposed proximate a respective side of the seat shell 202. Preferably, the energy absorbing assembly 400 also includes a pair of the impactor pistons 500, each disposed proximate a respective side of the seat shell 202 for engagement with a respective one of the energy absorbing members 402. Alternately, as shown in FIG. 8, the energy absorbing assembly 400 may include a pair of fore energy absorbing members 402a and a pair of aft energy absorbing members 402b, all supported by the seat base 300.

Preferably, each pair of fore and aft energy absorbing members 402a, 402b is disposed within a respective channel 306 of the seat base 300. Each energy absorbing member 402 is supported substantially along its lower face by the bottom 302 of the seat base 300. The energy absorbing members 402 may comprise an energy-absorbing material that is formed in a monolithic layered honeycomb-like structure. Preferably, the energy-absorbing material is aluminum, but may be any type of deformable material.

Figure 10:
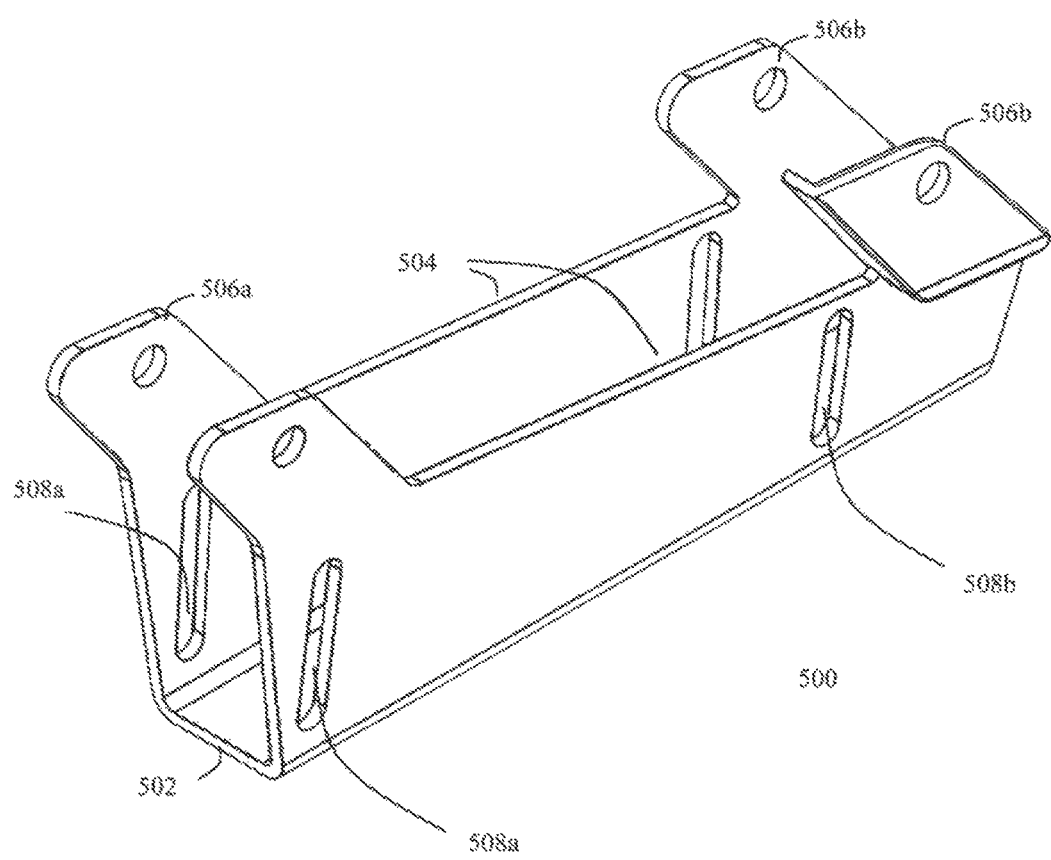
FIG. 10 is a perspective view of one of the impactor pistons.

As shown in FIG. 10, each impactor piston 500 has a substantially U-shaped configuration, and includes an impactor face 502 and a pair of parallel upright side walls 504 extending from the impactor face 502. Each impactor piston 500 also includes a pair of aligned fore through-holes 506a and a pair of aligned aft through-holes 506b all disposed in an upper region of the impactor piston 500. Each fore through-hole 506a is provided in a respective upright side wall 504 in a front region of the impactor piston 500. Similarly, each aft through-hole 506b is provided in a respective upright side wall 504 in a rear region of the impactor piston 500.

Each impactor piston 500 may be secured to the seat body assembly 200 at a respective support tube 204. The impactor pistons 500 may be secured to the support tubes 204 via a fore rod 404a extending through the support tubes 204 and the fore through-holes 506a of the impactor pistons 500, and an aft rod 404b extending through the support tubes 204 and the aft through-holes 506b of the impactor pistons 500 (see FIGS. 5 to 8). Alternately, the impactor pistons 500 may be secured directly to the seat shell 202 of the seat body assembly 200. Preferably, however, the impactor pistons 500 are disposed beneath the seat portion of the seat shell 202 to thereby direct impact forces (such as those occurring during a rapid deceleration of the vehicle) vertically downwards towards the seat base 300.

In addition to the through-holes 506, each impactor piston 500 includes a pair of front impactor apertures 508a and a pair of rear impactor apertures 508b all disposed in a lower region of the impactor piston 500, proximate the impactor face 502. Each front impactor aperture 508a is provided in a respective upright side wall 504 in a front region of the impactor piston 500, below the fore through-holes 506a. Similarly, each rear impactor aperture 508b is provided in a respective upright side wall 504 in a rear region of the impactor piston 500, below the aft through-holes 506b.

Each impactor piston 500 is coupled to the seat base 300 via a pair of fore pins 406a each extending through a pair of the front impactor apertures 508a and a pair of the fore through-holes 308a of the seat base 300, and a pair of aft pins 406b each extending through a pair of the rear impactor apertures 508b and a pair of the aft through-holes 308b of the seat base 300 (see FIGS. 5 to 8). Accordingly, when the impactor pistons 500 are coupled to the seat base 300 via the pins 406, the front impactor apertures 508a are in alignment with the fore through-holes 308a of the seat base 300, and the rear impactor apertures 508b are in alignment with the aft through-holes 308b of the seat base 300.

As shown in FIG. 10, each impactor aperture 508 comprises an elongate or substantially elliptical aperture. When the impactor pistons 500 are coupled to the seat base 300 via the pins 406, the major axis of each impactor aperture 508 is parallel to a respective one of the aforementioned substantially vertical planes. As a result, the impactor pistons 500 are coupled to the seat base 300 such that, when the child safety seat 100 is mounted as a front-facing safety seat, the front and rear regions of the impactor pistons 500 translate linearly along the aforementioned respective substantially vertical planes during the rapid deceleration of the child safety seat 100 (and the motor vehicle). Therefore, during the rapid deceleration of the vehicle (and the child safety seat 100), the seat body assembly 200 also moves linearly towards the seat base 300.

As will be explained, as the seat body assembly 200 moves linearly towards the seat base 300, the impactor pistons 500 move towards, engage and ultimately deform the energy absorbing members 402 and thereby dissipate kinetic energy through the energy absorbing members 402. Preferably, the orientation of the major axis of the impactor apertures 508 is engineered such that the seat body assembly 200 will begin translating vertically towards the seat base 300 before any significant horizontal movement of the seat body assembly 200. Accordingly, the major axis of the impactor apertures 508 may be inclined relative to vertical such that the seat body assembly 200 translates a short distance horizontally towards the front of the seat base 300 as the seat body assembly 200 moves vertically towards the seat base 300.

Prior to the rapid deceleration of the vehicle and the child safety seat 100, preferably the seat body assembly 200 is disposed in a "pre-impact position" relative to the seat base 300, in which the impactor pistons 500 are prevented from moving towards and engaging the energy absorbing members 402 unless and until the impact forces on the seat body assembly 200 reaches or exceeds a predetermined maximum limit, such as those that are typically experienced in a motor vehicle collision.

Figure 11A:
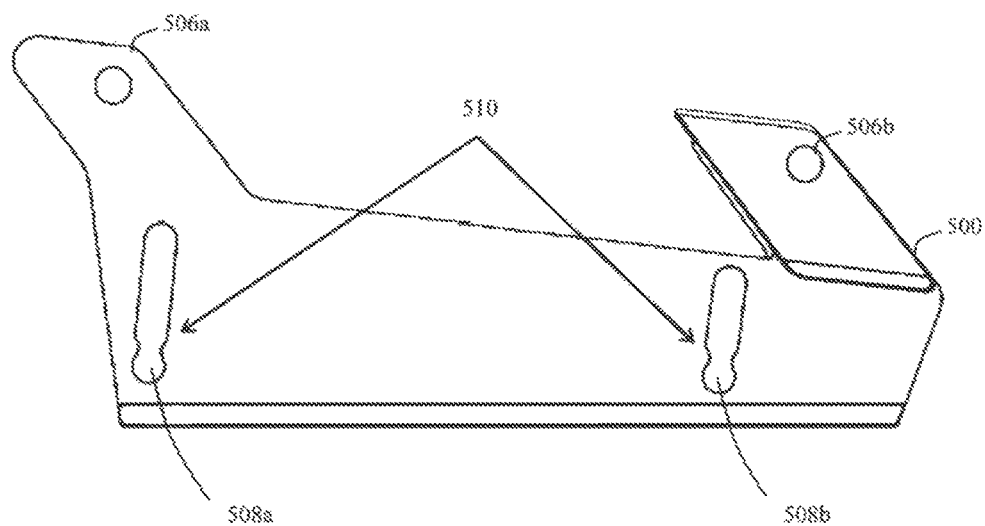
FIG. 11a is a side plan view of one embodiment of the impactor pistons.
Figure 11B:
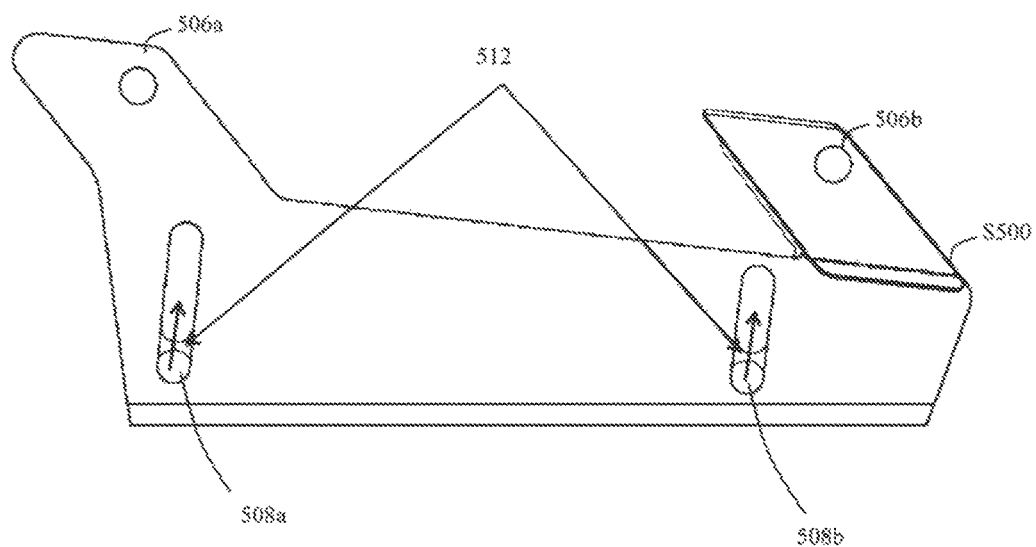
FIG. 11b is a side plan view of another embodiment of the impactor pistons.

Accordingly, the impactor apertures 508 may each have a key-hole configuration in which the aperture 508 includes one or more interference members 510 (see FIG. 11a) that extend partially into the aperture 508 (proximate the lower end of the impactor aperture 508). The interference members 510 retain the pins 406 proximate the lower end of the respective apertures 508 when the child safety seat 100 is not exposed to significant impact forces (i.e. the vehicle is not involved in a collision). However, when the impact forces on the seat body assembly 200 exceed the predetermined maximum limit, the interference members 510 yield to the pins 406 and allow the impactor pistons 500 to move downwards relative to the pins 406 until the pins 406 engage the upper end of the impactor apertures 508. Alternately, the impactor apertures 508 may each include a thin-walled member 512 (e.g. 0.5 mm to 1 mm thick) that extends across the width of the impactor aperture 508 (see FIG. 11b) proximate the lower end of the impactor apertures 508. The thin-walled members 512 retains the pins 406 proximate the lower end of the aperture 508, and yield to the pins 406 when the impact forces on the seat body assembly 200 exceed the predetermined maximum limit.

As will be apparent, with either of these variants of the impactor apertures 508, the pins 406 are maintained in the pre-impact position within the impactor apertures 508, proximate the lower end of the impactor apertures 508, prior to a rapid deceleration of the vehicle and the child safety seat 100. Conversely, the pins 406 are released from the pre-impact position and the impactor pistons 500 are allowed to translate relative to the pins 406 during a rapid deceleration of the vehicle and the child safety seat 100, when the impact forces on the seat body assembly 200 exceed the predetermined maximum limit.

Preferably, at least one of the impactor pistons 500 is configured to transfer kinetic energy to the associated energy absorbing member 402 (and thereby decelerate the seat body assembly 200) at different rates as the seat body assembly 200 moves towards the seat base 300. Further, preferably the rate of transfer of kinetic energy to the energy absorbing members 402 increases as the impactor pistons 500 move from the pre-impact position, such that the rate of deceleration of the impactor pistons 500 and the seat body assembly 200 relative to the seat base 300 increases the farther the impactor pistons 500 translate from the pre-impact position.

Figure 12:
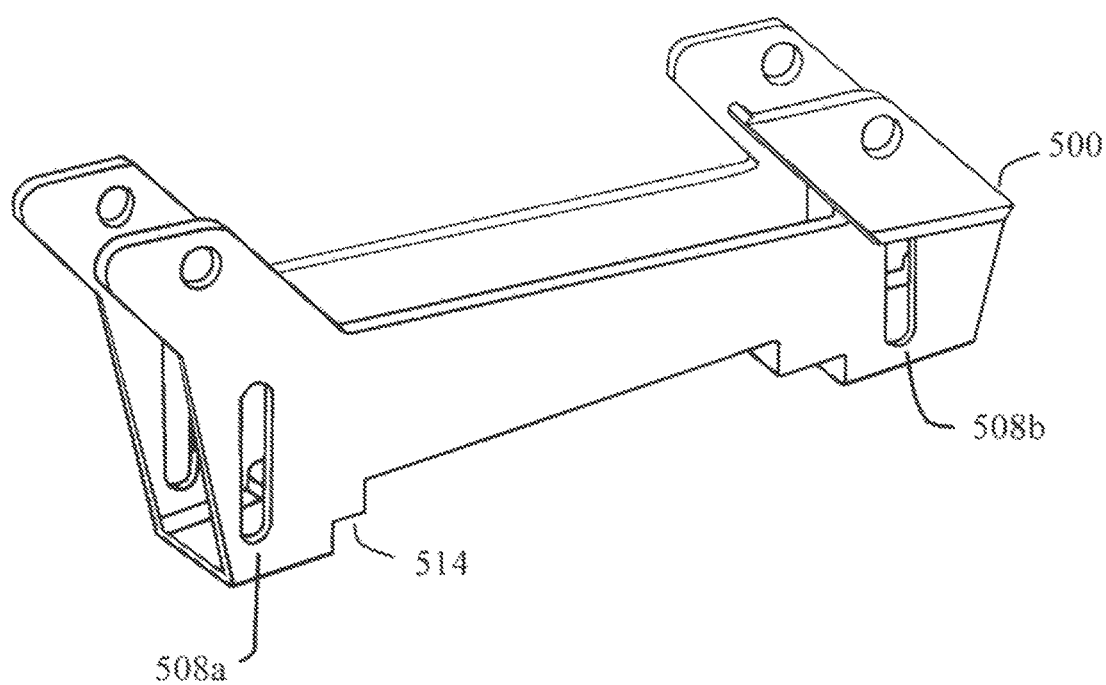
FIG. 12 is a perspective view of the left and front of an impactor piston, depicting an implementation of the impactor face.
Figure 13:
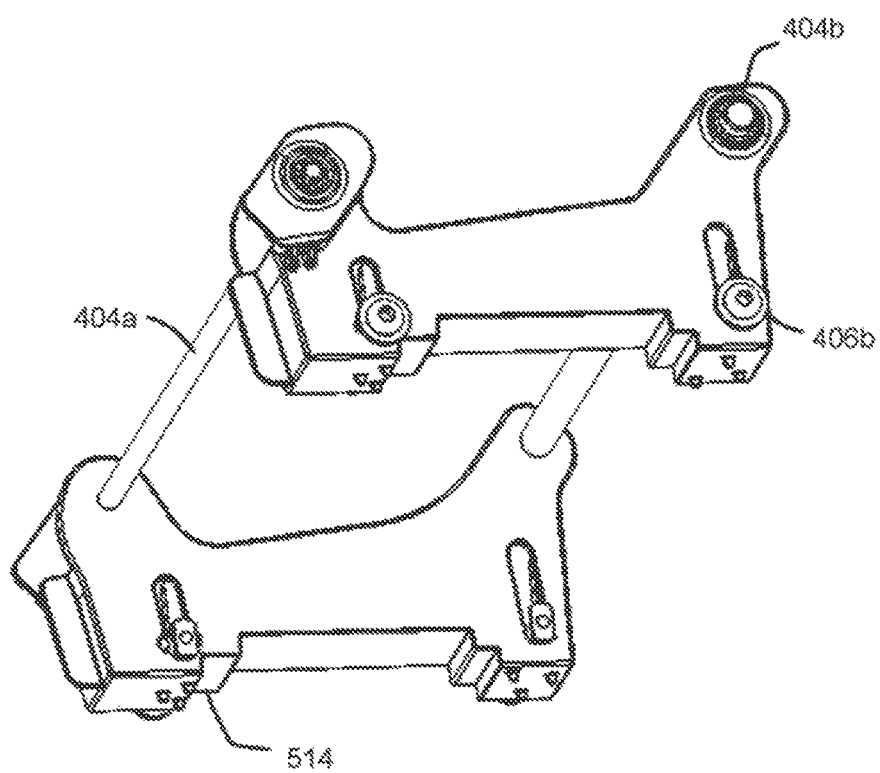
FIG. 13 is a perspective view of the right and rear of an impactor piston, depicting an implementation of the impactor face.

More preferably, the impactor pistons 500, together with the energy absorbing members 402, provide a step-wise-increasing form of energy absorption as the seat body assembly 200 moves linearly towards the bottom 302 of the seat base 300. Accordingly, as shown in FIGS. 12 and 13, the impactor face 502 may include a plurality of impactor stages 514 that are each configured to engage a respective region of the energy absorbing member 402. Further, when the impactor pistons 500 are disposed in the pre-impact position, preferably one of the impactor stages extends in closer proximity to the energy absorbing member 402 than the other impactor stage(s). Accordingly, one of the impactor stages will engage the energy absorbing member 402 before the other impactor stages, such that the total surface area of the impactor face 502 that is in engagement with the energy absorbing member 402 increases the farther the impactor piston 500 translates from the pre-impact position.

As discussed, the child safety seat 100 is intended for installation in a motor vehicle, as a front-facing or rear-facing safety seat. When the safety seat 100 is disposed on a car seat of the vehicle, the safety seat 100 is secured to the vehicle by passing the lap belt of the vehicle seat through the rear lap belt guides 208 (when mounted as front-facing safety seat 100) or the front lap belt ports 210 (when mounted as rear-facing safety seat 100) and tightening the lap belt until the seat body assembly 200 is held against the seat back of the vehicle seat. Preferably, the top tether strap 102 is also secured to the vehicle when mounted as front-facing safety seat 100. A child is retained in the child safety seat 100 via the child restraint belt system 104.

Figure 14A:
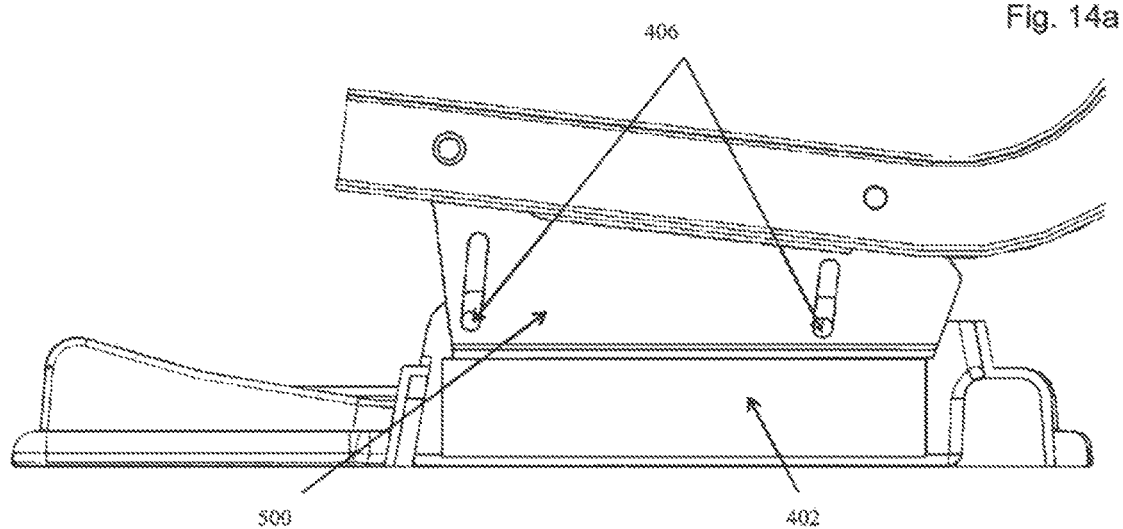
FIG. 14a is schematic view of the impactor pistons and the energy absorbing members in a pre-impact position.

In normal operation, such as when the vehicle is moving at a constant speed, or is accelerating (positively or negatively) at a rate less than that normally experienced during a vehicle collision, the seat body assembly 200 is retained in the "pre-impact position" relative to the seat base 300, in which the pins 406 of the energy absorbing assembly 400 are retained in the impactor apertures 508 proximate the lower end thereof (for example, by the interference members 510 or the thin-walled members 512). In this position, the impactor pistons 500 are prevented from moving towards and engaging the energy absorbing members 402 (see, for example, FIGS. 7, 14*a*).

When the vehicle decelerates rapidly, the seat body assembly 200 will be exposed to horizontal and vertical impact forces due to the momentum of the child and the seat body assembly 200. The horizontal impact forces will urge the seat body assembly 200 in a horizontal direction away from the vehicle seat back. However, since the seat body assembly 200 is secured to the vehicle seat by at least the vehicle lap belt, the seat body assembly 200 is prevented from travelling a significant distance horizontally relative to the vehicle seat back.

If the safety seat 100 is mounted as a front-facing safety seat, and the vertical impact forces on the pins 406 (resulting from the vector summation of the momentum of the child and the seat body assembly 200) are not significant (e.g. the vehicle has not been involved in a collision), the pins 406 will be retained in the impactor apertures 508 proximate the respective lower ends thereof. Similarly, if the safety seat 100 is mounted as a rear-facing safety seat, the pins 406 will be retained in the impactor apertures 508 proximate the respective lower ends thereof. As a result, the seat body assembly 200 will remain in the "pre-impact position" relative to the seat base 300.

Figure 14B:
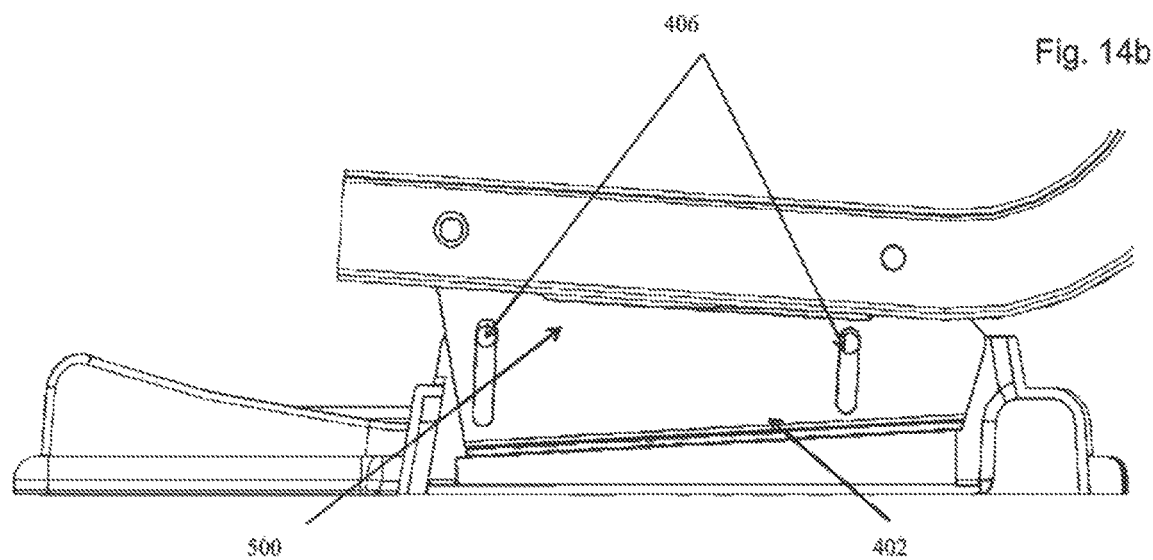
FIG. 14b is schematic view of the impactor pistons and the energy absorbing members in a post-impact position.
Figure 15:
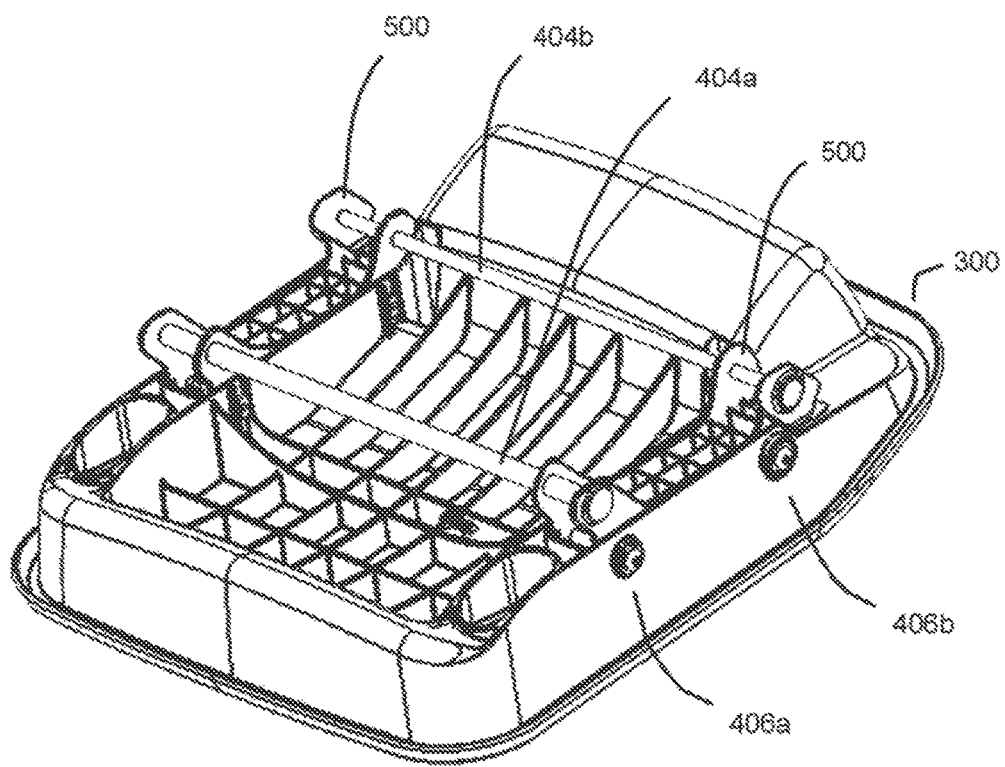
FIG. 15 is a perspective view of the left and front of the child safety seat in a post-impact mode, depicted without the seat shell, cushions and seat support rails.
Figure 16:
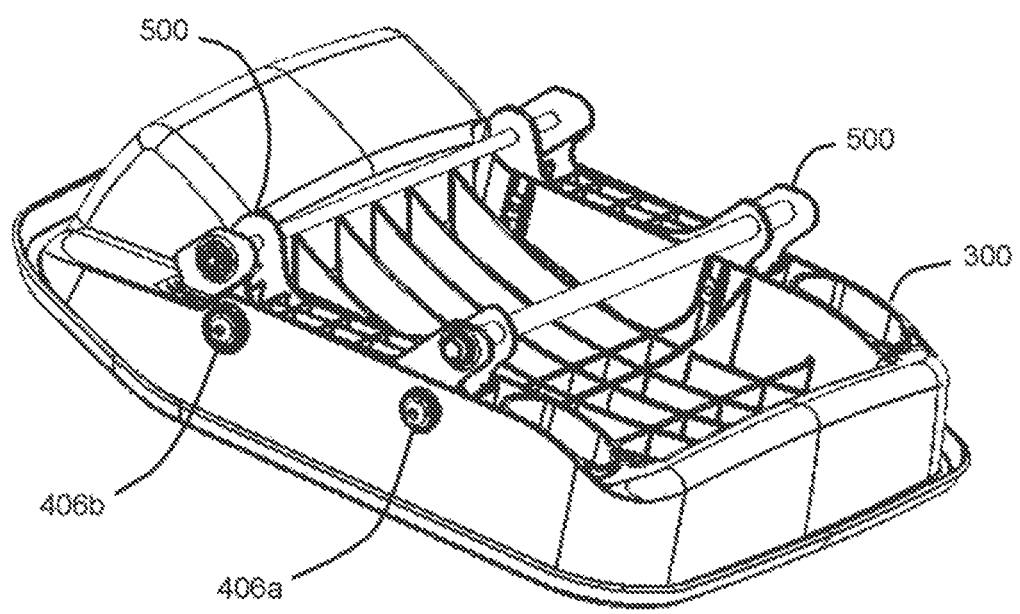
FIG. 16 is a perspective view of the right and front of the child safety seat of FIG. 10.

However, if the safety seat 100 is mounted as a front-facing safety seat and the vertical impact forces on the pins 406 of the energy absorbing assembly 400 exceed the predetermined maximum limit allowed by the interference/thin-walled member(s) of the impactor apertures 508 (e.g. the vehicle has been involved in a collision), the pins 406 will break through the interference/thin-walled member(s), thereby allowing the impactor pistons 500 to move downwards relative to the pins 406, towards the seat base 300, in a substantially vertical direction as determined by the pins 406 and the orientation of the impactor apertures 508. As a result, the front and rear portions of the seat body assembly 200 will translate substantially linearly towards the bottom 302 of the seat base 300 respectively along the substantially-vertical planes defined by the major axis of each of the impactor apertures 508 (see, for example, FIGS. 14*b*, 15, 16).

Figure 17:
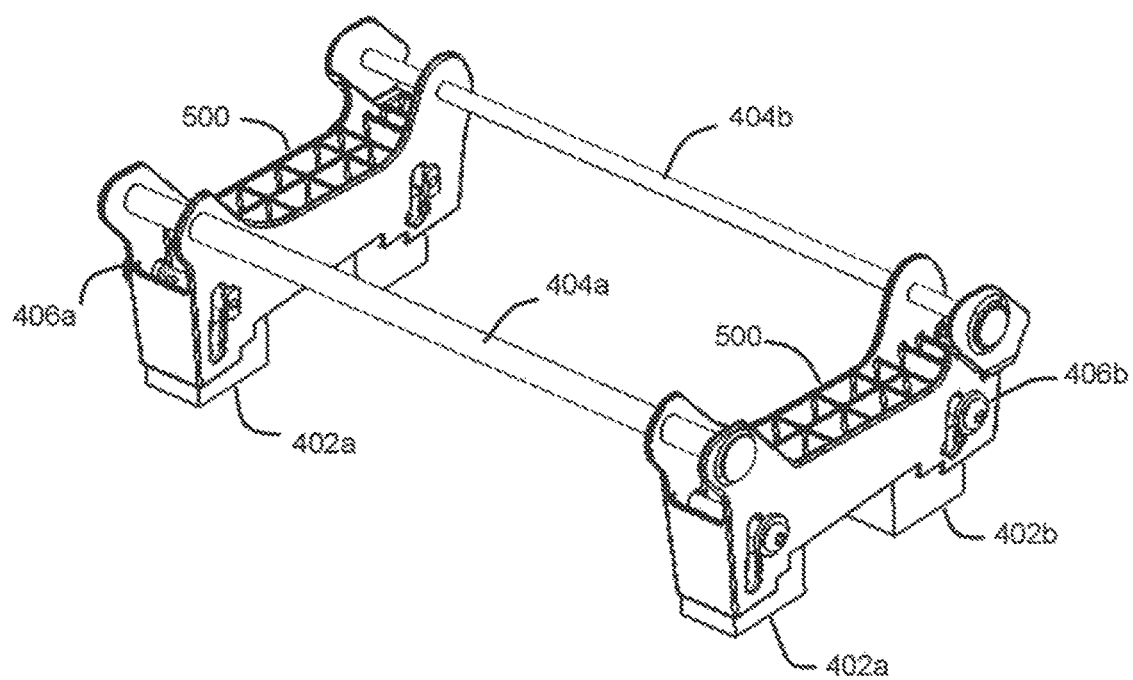
FIG. 17 is a perspective view of the left and front of the child safety seat of FIG. 10, depicted without the seat base, depicting the deformation of the energy absorbing members post-impact.

As the seat body assembly 200 begins to vertically translate towards the seat base 300, the impactor face 502 of the impactor pistons 500 will engage and deform the energy absorbing members 402 (see, for example, FIGS. 14*b*, 17), thereby causing the kinetic energy of the seat body assembly 200 to be transferred to the energy absorbing members 402, and the vertical impact forces on the child to be transferred through the impactor pistons 500 to the energy absorbing members 402. Therefore, the seat body assembly 200 will decelerate vertically relative to the seat base 300.

As the seat body assembly 200 continues to move towards the seat base 300, the number of impactor stages that engage the energy absorbing member 402 increases and, therefore, the surface area of the impactor face 502 that is available to deform the energy absorbing member 402 step-wise increases. As a result, the energy absorbing members 402 become step-wise deformed, and the deceleration of the seat body assembly 200 step-wise increases, as the seat body assembly 200 continues to move towards the seat base 300, thereby bringing the child to a more gradual stop than would be the case without the energy absorbing assembly 400.

Preferably, the predetermined maximum limit of the impact forces and the orientation of the major axis of the impactor apertures 508 are engineered such that the seat body assembly 200 will begin translating towards the bottom 302 of the seat base 300 before any significant horizontal movement of the seat body assembly 200. More preferably, the orientation of the major axis of the impactor apertures 508 is engineered so as to fine tune the absorption of kinetic energy in both the horizontal and vertical directions. For example, to reduce the total impact forces on the child in the child safety seat 100, the inclination angle of the major axis of the impactor apertures 508 relative to vertical may be selected such that the vertical impact forces resulting from the vehicle collision are substantially entirely dissipated through the energy absorbing members 402 before the horizontal impact forces resulting from the vehicle collision are imparted to the seat body assembly 200.

In addition to imparting horizontal and vertical impact forces, the vehicle collision also imparts a rotational force on the seat body assembly 200 (i.e. the top of the seat back of the seat body assembly 200 will tend to rotate towards the front of the seat base 300 when the child safety seat 100 is mounted as front-facing safety seat). The energy absorbing assembly 400 may be configured to oppose this rotational force. Variants suitable to address this problem include, but are not limited to:

- providing the rear impactor apertures 508b with a different vertical orientation and/or a different shape and/or length to that of the front impactor apertures 508a, so as to deform the energy absorbing members 402 at a front region thereof at a lower rate than at a rear region thereof;
- increasing the surface area of the impactor pistons 500 at a front region thereof relative to the rear region thereof and/or providing the impactor face 502 at a front region of the impactor piston 500 with a different shape and/or a different number of impactor stages than at the rear region of the impactor piston 500, to thereby deform the fore energy absorbing members 402a at a lower rate than the aft energy absorbing members 402b;
- configuring the predetermined maximum limit allowed by the interference/thin-walled member(s) of the front impactor apertures 508a to be greater than that allowed by the rear impactor apertures 508b;
- configuring the aft energy absorbing members 402b to deform more readily in response to a transfer of kinetic energy than the fore energy absorbing members 402a; and
- securing the top tether strap 102 to the vehicle.

Other variations to the energy absorbing assembly 400 will be apparent to those of ordinary skill in the art and are intended to be encompassed by the invention as claimed.

The invention claimed is:

1. A child safety seat comprising:
a seat base including a bottom; and
a seat body assembly slidably coupled to the seat base;
an energy absorber configured to (i) translate a front portion of the seat body assembly substantially linearly towards the bottom along a front plane during a deceleration of the child safety seat, (ii) translate a rear portion of the seat body assembly substantially linearly towards the bottom along a rear plane during the deceleration of the child safety seat, and (iii) dissipate impact forces imposed on the seat body assembly during the deceleration of the child safety seat, wherein the rear plane is parallel to the front plane, and the front and rear planes have a common incline angle; and
wherein, during the deceleration of the child safety seat, the incline angle facilitates substantially entire dissipation of a vertically-oriented component of the impact forces through the energy absorber prior to dissipation of a horizontally-oriented component of the impact forces.

2. The child safety seat according to claim 1, wherein the energy absorber is configured to lower a centre of gravity of the seat body assembly during the deceleration.

3. The child safety seat according to claim 1, wherein the energy absorber comprises an energy absorbing member supported by the seat base, and an impactor piston secured to the seat body assembly and the seat base such that a front portion of the impactor piston translates along the front plane towards the bottom during the deceleration of the child safety seat, and a rear portion of the impactor piston translates along the rear plane towards the bottom during the deceleration of the child safety seat.

4. The child safety seat according to claim 3, wherein the seat base includes a fore through-hole disposed in a fore region thereof, and an aft through-hole disposed in an aft region thereof, the impactor piston includes a front impactor aperture disposed in a front region thereof in alignment with the fore through-hole, and a rear impactor aperture disposed in a rear region thereof in alignment with the aft through-hole, and the seat body assembly is coupled to the seat base via pins each extending through a respective one of the through-holes and the impactor aperture that is in alignment with the one through-hole.

5. The child safety seat according to claim 4, wherein the impactor apertures each comprise elongate apertures having a major axis that is parallel to the planes.

6. The child safety seat according to claim 5, wherein the seat base comprises a pair of side walls and a channel disposed therebetween, the energy absorbing member is disposed within the channel, the through-holes are provided in the side walls, and the elongate apertures are configured to maintain the pins in a pre-impact position within the elongate apertures, and to release the pins from the pre-impact position and to allow the impact piston to translate relative to the pins when the vertical-oriented component of the impact forces exceeds a predetermined maximum limit.

7. The child safety seat according to claim 3, wherein the impactor piston is configured to provide a step-wise-increasing form of energy absorption as the seat body assembly moves linearly towards the bottom.

8. The child safety seat according to claim 7, wherein a face of the impactor piston includes a plurality of impactor stages each configured to engage a respective region of the energy absorbing member, and each said impactor stage is configured to transfer energy to the energy absorbing member at different rates.

9. The child safety seat according to claim 1, wherein the energy absorber comprises an energy absorbing member, and an impactor piston configured to dissipate the vertically-oriented component of the impact forces by deforming the energy absorbing member during the deceleration of the child safety seat.

10. The child safety seat according to claim 9, wherein the energy absorbing member comprises a fore energy absorbing member and an aft energy absorbing member disposed aft of the fore energy absorbing member, and the aft energy absorbing member is configured to deform more readily than the fore energy absorbing member, in response to the impactor piston dissipating the vertically-oriented component of the impact forces.

11. The child safety seat according to claim 9, wherein the impactor piston is configured to deform the energy absorbing member during the deceleration of the child safety seat at a front region of the energy absorbing member at a lower rate than at a rear region of the energy absorbing member.

* * * * *